United States Patent
Wisseroth et al.

[15] 3,687,917
[45] Aug. 29, 1972

[54] HOMOPOLYMERIZATION OR COPOLYMERIZATION OF VINYL CHLORIDE IN THE ABSENCE OF SOLVENTS OR DISPERSING AGENTS

[72] Inventors: Karl Wisseroth, Ludwigshafen; Hans-Georg Trieschmann, Hambach; Peter Dodel, Ludwigshafen; Lothar Hoehr, Buerstadt; Rudolf Herbeck, Frankenthal; Richard Scholl, Gruenstadt, all of Germany

[73] Assignee: Badische Anilin- & Soda-Fabrik Aktiengesellschaft Ludwigshafen(Rhine), Rhineland-Pfalz, Germany

[22] Filed: Aug. 19, 1970

[21] Appl. No.: 65,236

[30] Foreign Application Priority Data

Aug. 22, 1969 Germany..........P 19 42 823.0

[52] U.S. Cl.......260/85.5 XA, 260/87.1, 260/87.5 C, 260/87.7, 260/92.8 R
[51] Int. Cl...........C08f 3/30, C08f 1/04, C08f 15/02
[58] Field of Search......260/85.5, 86.3, 87.5 C, 87.7, 260/92.8 R

[56] References Cited

UNITED STATES PATENTS 3,522,227 7/1970 Thomas...................260/92.8
3,475,398 10/1969 Jobard......................260/92.8

FOREIGN PATENTS OR APPLICATIONS 6,709,001 12/1967 Netherlands.............260/92.8

Primary Examiner—Joseph L. Schofer
Assistant Examiner—John A. Donahue, Jr.
Attorney—Johnston, Root, O'Keeffe, Keil, Thompson & Shurtleff

[57] ABSTRACT

Process for the polymerization of vinyl chloride in the absence of solvents or dispersing agents in two stages.

In the first stage the liquid monomers are polymerized to a conversion of from 1 to 15 percent; in the second stage polymerization is continued in the powder phase in the absence of liquid vinyl chloride.

The process may be carried out continuously and gives very pure polymers which may be used for all purposes for which polyvinyl chloride is usually employed.

10 Claims, No Drawings

HOMOPOLYMERIZATION OR COPOLYMERIZATION OF VINYL CHLORIDE IN THE ABSENCE OF SOLVENTS OR DISPERSING AGENTS

The polymerization of vinyl chloride in the absence of solvents or dispersing agents, referred to as bulk polymerization, begins in liquid vinyl chloride. Due to the insolubility of the polymer in the monomer, the reaction product separates out as a solid phase in the reaction medium during polymerization. The polyvinyl chloride formed can absorb sufficient monomeric vinyl chloride to produce a slurry at conversions as low as about 10–15 percent by weight and upwards, this slurry consisting of agglomerates of solid polymer swollen by liquid monomer. At conversions above about 75–85 percent this slurry phase changes into a powder phase which consists of dry polymer containing absorbed gaseous monomer.

The polymerization of vinyl chloride is combined with strong heat effects so that the removal of the heat of polymerization is the main problem in bulk polymerization. The heat transfer in the highly inhomogeneous slurry phase is particularly difficult; unless care is taken to ensure thorough mixing of the reaction mixture, overheating readily occurs and this may lead to discoloration and the formation of lumps. Moreover, the walls of the reaction vessel exhibit the growth of incrustations which hinder the transfer of heat to the cooling jacket.

The prior art processes for the bulk polymerization of vinyl chloride must therefore employ expensive mixing equipment such as tumbling mills containing indifferent grinding media or complicated stirring systems in the form of ribbon blades which are spirally arranged around a shaft and sweep the walls in order to improve heat transfer through them.

French Pat. No. 1,261,921 describes the use of this principle of polymerization in continuous operation. Apart from the fact that complicated grinding equipment is necessary, it has been found that such a process cannot be carried out continuously for long periods of time since even when the said grinding equipment is used it is not possible to completely avoid agglomeration in the slurry phase and consequently the polymerization reaction must be stopped at frequent intervals as a result of the discharge equipment and pipes being clogged up.

A number of continuous processes for the polymerization of vinyl chloride has already been described in which, at a conversion of about 10 percent, part of the polymer suspension is drawn off and subjected to a separating operation to remove the liquid monomer. Since, however, such separating operations and the subsequent drying of the moist polymer are highly expensive operations, such processes have not be adopted in industry.

French Pat. No. 1,382,072 describes a process for the bulk polymerization of vinyl chloride in two stages in which fast stirring in the first stage and slow stirring in the second stage lead to a high bulk density and uniform grain size distribution of the resulting products. This process is operated batchwise, however, and cannot be worked continuously due to the aforementioned difficulties which occur in the slurry phase in the second stage.

Finally, German Pat. No. 975,823 describes a method of polymerizing vinyl chloride in the powder phase in which liquid or gaseous vinyl chloride is introduced into a bed of powdered polyvinyl chloride where it is polymerized. In this way the formation of lumps in the slurry phase is avoided, but when attempts are made to operate this method continuously it is found that, as the on-stream period increases, so too does the grain size of the resulting product and at the same time the grain size distribution becomes less and less uniform.

It is therefore an object of the present invention to provide a process for the manufacture of vinyl chloride polymers which may be operated continuously for long periods of time without stoppages and which gives a product having satisfactory grain properties.

We have found that this object is achieved and that the homopolymerization and copolymerization of vinyl chloride can be carried out continuously in the absence of appreciable amounts of solvents or dispersing agents in two stages, each of which may comprise one or more polymerization units connected in parallel or series, the conditions of polymerization being otherwise conventional, by polymerizing liquid monomer in the first stage to a conversion of from 1 to 15 percent by weight, transferring the resulting suspension to the second stage where the monomer partial pressure is below the liquifying pressure at the given temperature, continuing polymerization in the powder phase and continuously removing the polymer from the last polymerization unit at the rate at which it is formed.

The process is particularly suitable for the manufacture of polyvinyl chloride. However, it may also be used for the production of copolymers of vinyl chloride with up to 30 percent by weight of comonomers such as vinylidene chloride, vinyl acetate, acrylonitrile, ethylene or propylene.

The polymerization should be carried out in the absence of appreciable quantities of solvents or dispersing agents. This however does not exclude the possibility of negligible amounts of solvents being present in the polymerization mixture which have for example been introduced a solvents for solid initiators. If their boiling point is sufficiently low, they will be automatically removed from the reaction mixture when the finished polymer is discharged or the pressure released. Their boiling point should preferably be below 75° C, and their concentration with reference to the solid polymer should be below 1 percent by weight.

The temperature at which the polymerization is carried out is dependent on the desired molecular weight of the polymer to be produced, expressed by the K value (according to Fikentscher, Cellulosechemie, 13, 60 (1932). It may be in the range 0° to 75° C. All initiators normally used in the polymerization of vinyl chloride may be employed; the type of initiator depends on the desired polymerization temperature. If it is desired to polymerize at relatively high temperatures, examples of suitable initiators are azodiisobutyronitrile, benzoyl peroxide and lauroyl peroxide. At somewhat lower temperatures it is advantageous to use isopropyl percarbonate, tertbutyl perpivalate or acetylcyclohexane sulfonyl peroxide. Mixtures of the said initiators may also be used. Polymerization may be carried out at very low temperatures if redox systems, such as combinations of acetylcyclohexane sulfonyl peroxide with triethanolamine, ascorbic acid or acetaldehyde, are used. The polymerization may also be initiated at relatively low temperatures with aluminum alkylene or boron alkylene. It is possible to use a rapidly decomposing initiator in the first stage and a slowly decomposing initiator in the second stage or vice versa, or the polymerization may be carried out with the same initiator in both stages, in which case no further initiator need be added in the second stage. Where redox systems are used it is advantageous to add the reducing component in the second stage.

Conventional additives may be present during the polymerization, such as polymerization modifiers or hydrogen chloride binding agents.

1. The pre-polymerization in the first stage is carried out, in the simplest case, in a vertical reactor in which agitation may be effected by conventional stirrers, and if polymerization is only carried through to low conversions at which the supension is still veryl liquid, agitation may be effected by boiling the suspension under reflux. Polymerization in this pre-reactor may be effected continuously by continuously adding liquid vinyl chloride and initiator and withdrawing the resulting suspension at the same rate and transferring it to the second stage. The pre-polymerization may also be carried out batchwise either by stopping the reaction at the desired conversion level, for example by cooling, or by adding only such an amount of initiator that it is completely used up when the desired conversion has been reached.

In this case it is advantageous to employ two or more polymerizations units, pre-polymerization being carried out in one reactor whilst the suspension is transferred from a second reactor to the second stage. In principle, it is possible to use two or more polymerization units connected in series in a cascade, polymerization being effected in the first reactor to a conversion of, say, 5 percent and in a second reactor to a conversion of, say, 10 percent.

The pre-polymerization carried out in the first stage is a bulk polymerization reaction, i.e., a suspension of solid polymer is present in liquid monomer. The polymerization temperature may be in the range 0° to 75° C, preferably from 50° to 70° C. Since the system used is a closed system, the pressure is an equilibrium pressure and is thus directly determined by the polymerization temperature. Heat removal may be effected by evaporative cooling or jacket cooling.

In the first stage, the polymerization is carried out to a conversion of from 1 to 15 percent by weight, i.e., the concentration of polymer in the suspension should be between 1 and 15 percent by weight. Since the suspension becomes somewhat viscous at conversions above 8 percent, it is preferred to operate at conversions below 8 percent. The best results are obtained when the conversion is between 4 and 6 percent.

2. The main polymerization carried out in the second stage may also be affected in a vertical reactor. Since the powder can be moved very easily, a simple anchor agitator, for example, is sufficient to achieve thorough mixing of the powder bed. However, it is advantageous to use an asymmetrical anchor agitator or a spiral agitator such as are described in German Pat. No. 1,218,265 and German Pat. application No. P 15 57 042 respectively. In this case, too, it is possible to connect a number of polymerization units in parallel so that a reactor in the first stage alternately supplies the suspension to a number of reactors in the second stage. It is however also possible to connect a number of polymerization units in series to form a cascade, powder being continuously removed from a first reactor and passed to a second reactor where the polymerization is continued by forcing in gaseous vinyl chloride, and so on. In this way a narrower particle size distribution may be obtained. In this case it is possible to realize the idea of an "endless cascade" using a preferably horizontal reaction tube which receives the suspension at one end and from which the finished polymer is continuously withdrawn at the other end so that the pulverulent polymerization mixture travels along the tube. If suitable stirring equipment is used to ensure that mixing takes place preferably transversely to the direction of travel of the powder and only to a minor extent in the longitudinal direction of the tube, it is possible to achieve very uniform growth of the polymer particles.

Polymer is removed from the last polymerization unit at the rate at which it is formed. This makes it possible to operate the second stage, the main polymerization stage, continuously. The removal of the polymer may be effected either via air locks or by means of dip tubes.

The polymerization temperature in the second stage may also be in the range 0° to 75° C, preferably from 30° to 60° C. The polymerization reactions in the two stages may, if desired, be carried out at different temperatures, the temperature in the first stage being preferably higher than that in the second stage. The partial pressure of the monomer in the second stage must be below the equilibrium pressure, i.e., it must be below the pressure which is required to liquify the monomer at the temperature used. A pressure difference of at least 0.1 atmosphere is necessary and it is advantageous to operate at a pressure difference of at least 1 atmosphere.

The presence of inert gases, such as nitrogen or argon, enables the total pressure prevailing in the reaction vessels of the second stage to be raised, provided that the partial pressure of the monomer remains below the equilibrium pressure and the monomer is therefore not liquified.

If the polymerization temperature in the first stage is higher than in the second stage, a pressure difference is created which is sufficient to transfer the suspension from the first stage to the second stage. During the transfer of the liquid phase which already contains suspended particles of polymer, it is advantageous to ensure that the solid polymer which separates out on entering the second polymerization stage is distributed as uniformly as possible. This is usually achieved, however, by the atomizing effect which occurs as the suspension passes the pressure gradient between the two polymerization stages, which effect may be improved by the use of nozzles as distribution aids.

The main advantage of the process of the invention over conventional methods of bulk polymerizing vinyl chloride is that the slurry phase is omitted so that polymerization in the second stage takes place in the dry powder phase, i.e., appreciable amounts of liquid vinyl chloride are not present in the reactor. In order to keep the partial pressure of the monomer in the reactor of the second stage below the liquifying pressure, it is necessary to remove the liquid vinyl chloride, which is contained in the 1–15 percent suspension transferred from the first stage, as quickly as possible from the reaction vessel in the second stage. Basically, this may be effected in two ways:

a. If the pressure in the reaction vessel in the second stage is kept very low and the suspension is slowly transferred from the first stage in small portions, the transferred vinyl chloride evaporates immediately. If the polymerization is caused to take place relatively quickly by using an appropriate catalyst system or by selecting a suitable polymerization temperature, it is possible to remove the liquid vinyl chloride by evaporation and polymerization.

b. However, the simpler and technically more reliable method is to vent the reaction vessel in the second stage for a short period immediately after the suspension has been transferred from the first stage so that the pressure built up by evaporation of the vinyl chloride is lowered again. In this way a portion of the liquid vinyl chloride, about 30 to 90 percent by weight, preferably from 60 to 0 percent by weight, is removed from the system and may be recycled to the first stage. The heat energy required to evaporate the liquid vinyl chloride is taken from the polymerization system in the second stage so that part of the heat of polymerization may be removed in this manner. The polymerization is not affected if small amounts of liquid vinyl chloride are introduced into the powder bed in the reactor of the second stage for short periods of time during the transfer of the suspension from the first stage to the dry powder bed since these portions of liquid monomer immediately evaporate when the pressure is released and the formation of a slurry is avoided.

Consequently, the powder bed is dry in the second stage of the polymerization in which the main part of the reaction takes place. This powder bed can be moved so easily that heat removal presents no problems. In principle, it may be effected by conventional jacket cooling, but in industrial plant the removal of the heat of reaction is only feasible when effected by the "principle of internal cooling" as described, for example, in German Pat. No. 1,013,870, in which case the heat of reaction is substantially removed by evaporating monomer.

Owing to the good heat transfer and the omission of the slurry phase, the formation of agglomerates in the polymerization units in the second stage is avoided with the result that large, very noisy grinding equipment is not necessary. For the first time the process of the invention enables vinyl chloride to be polymerized continuously on a commercial scale.

It is no longer necessary to follow each polymerization operation by opening, cleaning and closing the reactors and initiating polymerization anew.

The product obtained by the present method has properties which are not inferior to those of products obtained by conventional methods. Compared with suspension or emulsion polyvinyl chloride it has the advantage of higher purity because the addition of dispersing agents can be dispensed with.

By varying the polymerization temperature any desired K value may be obtained.

The average diameter of the resulting polyvinyl chloride particles is generally in the range 50 to 200 $\mu$. If, for special applications such as the manufacture of plasticized polyvinyl chloride, a very narrow grain size distribution is necessary, this may be achieved in a simple manner by effecting polymerization in the second stage in a horizontal reaction tube in which only vertical agitation is carried out. The product thus obtained then exhibits particularly good absorption of plasticizer.

EXAMPLE 1

A 10-liter reactor provided with an anchor agitator contains about 2.5 of liquid vinyl chloride which is kept at about 65° C by external cooling. The equilibrium pressure is about 11 atmospheres. Each hour there is added 0.1 g of azodiisobutyronitrile through a small air lock in the cover of the reactor, the azodiisobutyronitrile being flushed in with about 300 cm$^3$ of liquid vinyl chloride. There is arranged downstream of this reactor a 25-liter reactor equipped with a spiral agitator and containing about 5 kg of pulverulent polyvinyl chloride kept under a monomer pressure of about 8 atmospheres and at a temperature of 65° C substantially by external cooling. About 250 cm$^3$/hr of liquid vinyl chloride suspesnion containing not more than about 20 g of suspended solid polyvinyl chloride (conversion about 8 percent) obtained by polymerization in the first stage is transferred from the first reactor via a dip tube to the second stage as a result of the pressure difference between the two reactors. By simultaneously venting the second stage the pressure therein is kept at about 8 atmospheres. About 100–150 g/hr of dry pulverulent polyvinyl chloride is removed from the second stage through a dip tube and via a cyclone. The polymer was a K value of from about 65 to 70. The median of the grain size distribution is about 120–140 $\mu$, 85 percent of the particles of polymer having a diameter between 100 and 200 $\mu$. The polymerization was carried out for several weeks continuously without any major trouble, no substantial change in the particle size being observed during this period.

COMPARATIVE EXAMPLE 1a

For comparison purposes, an attempt was made to operate the process described in German Pat. No. 975,823 continuously.

Five kg of polyvinyl chloride was placed in a 25-liter reactor equipped with an anchor agitator. The polymerization temperature was set at 60° C. At this temperature the equilibrium pressure of the monomeric vinyl chloride was approximately 10 atmospheres. A solution of 0.1 g of azodiisobutyronitrile in vinyl chloride per hour was added through an air lock. By briefly opening a valve connected to a vinyl chloride line, gaseous vinyl chloride was pressured into the reactor until the pressure had reached about 8 atmospheres. After about 30 minutes the pressure had dropped to 7 atmospheres due to polymerization of the vinyl chloride, whereupon vinyl chloride was pressed in to raise the pressure to 8 atmospheres again. About 120 g of polyvinyl chloride was discharged per hour. Initially, the polymer particles had an average diameter of about 150 $\mu$; after the process had been operated for 1 week the average particle diameter had doubled, and after 4 weeks the process had to be stopped because some of the particles had become so large that the discharge lines had become blocked up.

COMPARATIVE EXAMPLE 1b

The procedure described in Example 1a was followed except that liquid vinyl chloride was fed into the reactor instead of gaseous vinyl chloride until the equilibrium pressure therein had reached 10 atmospheres. After the pressure had dropped to 9 atmospheres (on the average after about 20 minutes) liquid vinyl chloride was again pressed in to raise the pressure to 10 atmospheres again. About 180 g of product was discharged per hour. The particle diameter doubled after an on-stream period of only 4 days.

EXAMPLE 2

The polymerization is carried out in the same reactors and on the same basis as described in Example 1.

The polymerization initiator used is acetylsulfonyl cyclohexane peroxide in the form of a 10 percent solution in methylene chloride. In the first stage polymerization is carried out at 60° C under an equilibrium pressure of 9.5 atmospheres and with the addition of 0.05 g of initiator per hour. In the second stage the pressure is kept constant between 4.5 and 5 atmospheres at a temperature of 40° C. Since the initiator is almost completely consumed in the first stage, fresh initiator must be added in the second stage, the amount being 0.25 g of acetylsulfonyl cyclohexane peroxide per hour which is added via an air lock.

From 250 to 300 g of dry polyvinyl chloride is discharged per hour. The K value of the product is between 66 and 69 and its bulk density is 0.3 g/cm$^3$.

The median of the grain size distribution is about 150 $\mu$, 80 percent of the particles having a diameter between 90 and 250 $\mu$. Owing to its special grain structure the product has an outstanding absorptive capacity for plasticizers.

EXAMPLE 3

The procedure of Example 2 is followed except that in the first stage polymerization is carried out at 40° C and a pressure of 7 atmospheres with the addition of 0.25 g of acetylsulfonyl cyclohexane peroxide (10 percent solution in methylene chloride) per hour. At this temperature the initiator is only partly consumed in the first stage. In the second stage there is added, as reducing component 0.15 g of triethanolamine (10 percent solution in methylene chloride) per hour through an air lock and the polymerization is carried out at 32° C and a pressure of from 3.5 to 4 atmospheres.

From 150 to 200 g of a dry powder having a K value of from 68 to 72 and a bulk density of 0.3 g/cm$^3$ is discharged per hour.

Over an on-stream period of several weeks the median of the grain size distribution remains constant at about 130 $\mu$, 80 percent of the particles having a diameter between 60 and 200 $\mu$.

EXAMPLE 4

The polymerization in the first stage is carried out as in Example 3 in a vertical stirred autoclave except that 1 g of acetylsulfonyl cyclohexane peroxide is added per hour. The gas phase polymerization in the second stage is carried out in this Example in a horizontal tubular reactor having a ratio of length to diameter of 20:1 and equipped with a gate paddle agitator. In the second stage polymerization is carried out at 40° C and a pressure of from 4.5 to 5 atmospheres without the addition of further catalyst or accelerator. Here again, the pressure in the second stage is kept constant by releasing the pressure for a short time after the polymer suspension has been transferred from the first stage.

From 1.2 to 1.5 kg of product is discharged per hour. The product has a K value of from 65 to 70 and a bulk density of 0.28 g/cm$^3$. The median of the particle size distribution is about 120 $\mu$, the grain size distribution being very narrow: 90 percent of the particles having a diameter between 80 and 150 $\mu$.

We claim:

1. A continuous process for the manufacture of vinyl chloride polymers in the absence of appreciable amounts of solvents or dispersiong agents in two stages, each of which may comprise one or more polymerization units connected in parallel or series, the polymerization being carried out in the presence of free radical-forming initiators at temperatures between 0° and 75°C, the conditions of polymerization being otherwise conventional, wherein in the first stage liquid monomer is polymerized to a conversion of from 1 to 15 percent by weight, the resulting suspension is transferred to the second stage where the monomer partial pressure is below the liquifying pressure at the given temperature, from 30 to 90 percent by weight of the liquid vinyl chloride is removed from the system by venting during said transfer or immediately after said transfer, from the suspension coming from the first stage by venting the second stage, polymerization is continued in the powder phase and the polymer is continuously removed from the last polymerization unit at the rate at which it is formed.

2. A process as claimed in claim 1 wherein vinyl chloride is polymerized together with from 0 to 30 percent by weight of vinylidene chloride, vinyl acetate, acrylonitrile, ethylene or propylene.

3. A process as claimed in claim 1 wherein redox systems are used as initiators.

4. A process as claimed in claim 1 wherein the initiators are supplied to the polymerization vessel in the form of solutions inorganic solvents having a boiling point below 75° C.

5. A process as claimed in claim 1 wherein the polymerization temperature is higher in the first stage than in the second stage.

6. A process as claimed in claim 1 wherein the polymerization is carried out in the first stage at temperatures of from 50° to 70° C and in the second stage at temperatures of from 30° to 60° C.

7. A process as claimed in claim 1 wherein the polymerization in the first stage is carried out to a conversion of from 4 to 8 percent.

8. A process as claimed in claim 1 wherein the pressure in the first stage is at least 0.1 atmosphere higher than in the second stage.

9. A process as claimed in claim 1 wherein the pressure in the first stage is at least 1 atmosphere higher than in the second stage.

10. A process as in claim 7 wherein during the transfer of the suspension from the first stage to the second stage from 60 to 80 percent by weight of the liquid vinyl chloride is removed from the system by venting.

* * * * *

PO-1050
(5/69)

UNITED STATES PATENT OFFICE
CERTIFICATE OF CORRECTION

Patent No. 3,687,917            Dated August 29, 1972

Inventor(s) Karl Wisseroth et al

It is certified that error appears in the above-identified patent and that said Letters Patent are hereby corrected as shown below:

Column 5, line 25, "60 to 0 percent" should read -- 60 to 80 percent --

Column 6, line 14 "2.5 of" should read -- 2.5 L. of --

Column 8, line 1 of Claim 6 "in Claim 1" should read -- in Claim 5 --

Signed and sealed this 20th day of March 1973.

(SEAL)
Attest:

EDWARD M. FLETCHER, JR.             ROBERT GOTTSCHALK
Attesting Officer                    Commissioner of Patents